United States Patent [19]

Nakayama

[11] Patent Number: 5,483,626
[45] Date of Patent: Jan. 9, 1996

[54] METHOD AND APPARATUS FOR TRANSFORMING GRAPHICS

[75] Inventor: Yasutomo Nakayama, Asaka, Japan

[73] Assignee: International Business Machines Corporation, Armonk, N.Y.

[21] Appl. No.: 904,119

[22] Filed: Jun. 25, 1992

[30] Foreign Application Priority Data

Oct. 1, 1991 [JP] Japan ................................. 3-278895

[51] Int. Cl.⁶ ................................................. G06F 15/62
[52] U.S. Cl. ......................... 395/133; 395/123; 395/127; 395/143
[58] Field of Search ........................... 395/118–122, 123, 395/127, 128, 133–139, 142, 143, 155, 161

[56] References Cited

U.S. PATENT DOCUMENTS

| | | | |
|---|---|---|---|
| 4,972,330 | 10/1990 | Matsushiro et al. | 395/134 |
| 5,045,400 | 9/1991 | Esashi | 428/450 |
| 5,255,360 | 10/1993 | Peaslee et al. | 395/134 X |

FOREIGN PATENT DOCUMENTS 0241071  3/1987  European Pat. Off. ......... G06F 15/72

OTHER PUBLICATIONS

Foley et al. "Computer Graphics Principles and Practice" 1990.
"Computer Graphics" incremental computation of planar maps (Jul. 1989).

*Primary Examiner*—Almis Jankus
*Attorney, Agent, or Firm*—Norman L. Gundel

[57] ABSTRACT

A graphic-transforming apparatus and method are provided for freely transforming an object graphic with easy operations. A curve or polygonal line to be transformed, that is, the object graphic, and a pattern consisting of a closed curve and functioning as a ruler are set up and a transformation is executed in which a part of the object graphic is replaced with a part or the whole of the pattern by specifying a transformation range, that is, by specifying a starting point, an ending point, and the direction of the route according to certain rules. The pattern consists of any line drawing such as a circle or polygon, which can be moved (and also rotated, enlarged, and contracted) and freely operated on the object graphic like moving a ruler on a drawing paper. The following rules are applied to the starting point, ending point, and route. The starting point must be an intersection between the object graphic and the pattern. The ending point must be a point on the pattern. The specified portion from the starting point of the pattern to the ending point through the route in the specified direction must be replaced with the specified portion from the starting point of the object graphic to its ending point or its extreme point.

13 Claims, 10 Drawing Sheets

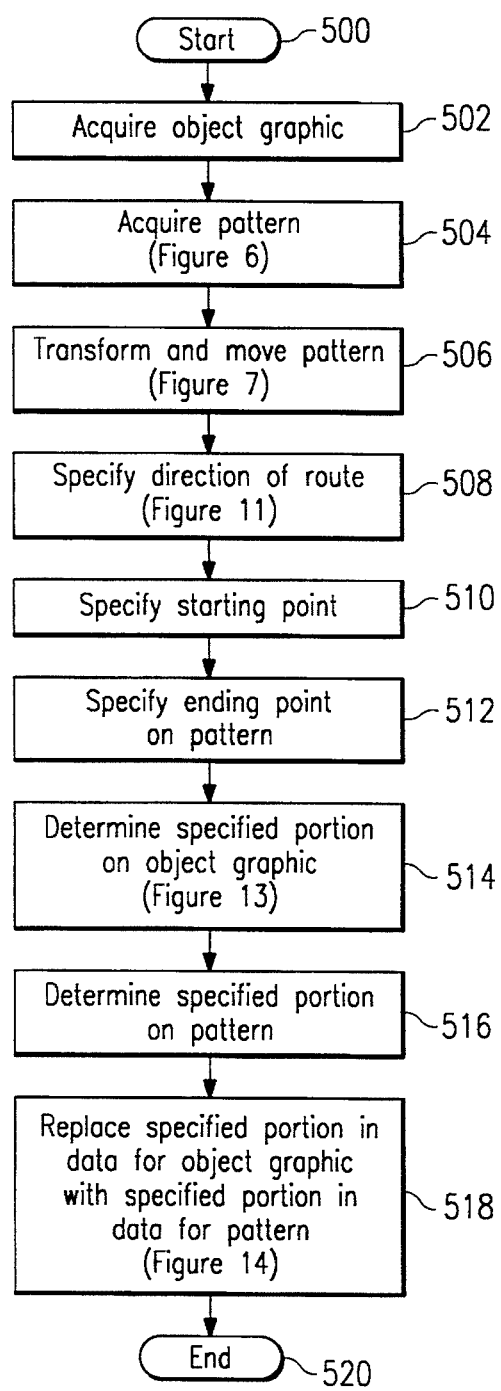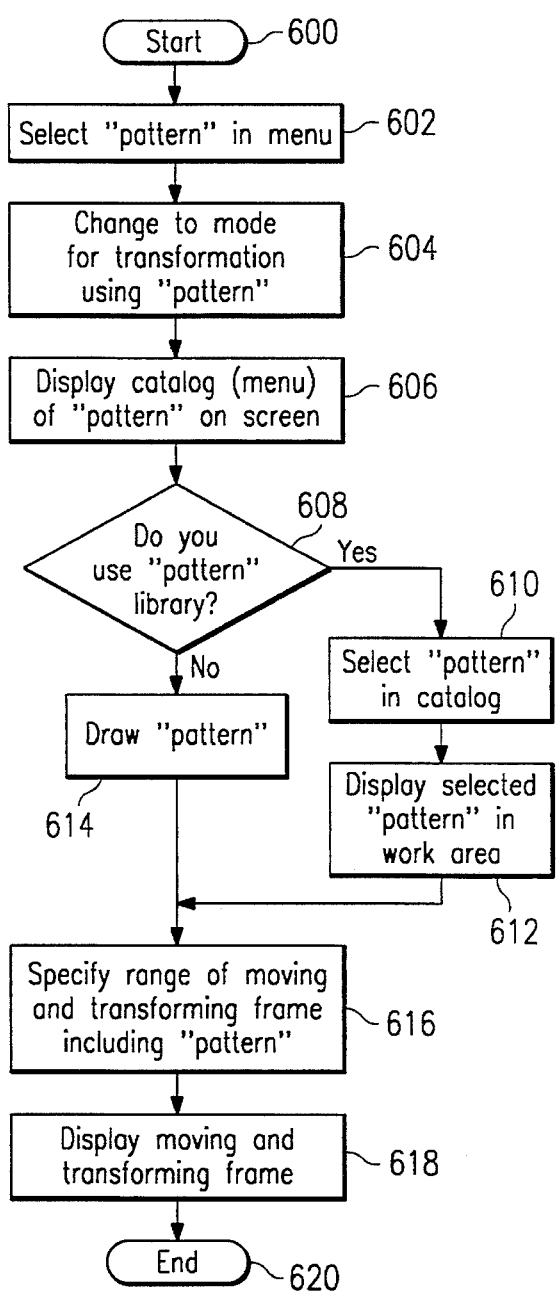

METHOD AND APPARATUS FOR TRANSFORMING GRAPHICS

BACKGROUND OF THE INVENTION

1. Field of the Invention

The present invention relates to a graphic transforming apparatus for freely transforming an object graphic or a line drawing consisting of curves or polygonal lines.

DESCRIPTION OF THE RELATED ART

To transform an object graphic shown on the display of a computer using graphics software, e.g., to plot a new curve by combining some generated polygonal lines and parts of a circle, a part of a curve is deleted and replaced with another curve. For some graphics software suited to the above operation, a specified option "intersection" is added to the function of "deletion". This function makes it possible to delete only unnecessary portions between intersections of the object graphic clicked by a mouse. However, if the unnecessary portion is a curved polygonal line, there is a disadvantage in that deletion must be executed many times, for every curved line segment. Moreover, the deleted portions must be separately corrected and drawn again.

Meanwhile, the official gazette of Published Unexamined Patent Application (PUPA) No. 3-91868 discloses a method in which the portion to be corrected of an object graphic is specified with a rectangle in order to delete line segments in the rectangle, and line segments contacting the rectangle from the outside are selected and automatically extended into the rectangle to connect two points by a straight line. However, this method can be used only for line segments in the original graphic and only straight lines can be drawn.

The official gazette of PUPA No. 1-112380 discloses a method in which starting and ending points of a line segment to be deleted are indicated in order to accurately connect the two points with a straight line. In this case also, only a straight line can be drawn between two points.

In addition to the above, the official gazette of PUPA No. 64-1062 discloses a method in which unnecessary portions of an object graphic can be deleted using an erasing shield. However, the deleted portions must be separately corrected and drawn again. Therefore, for most conventional graphic transforming apparatuses, a graphic can only be transformed under a limited range and limited conditions, or complicated operations are required to transform the graphic.

SUMMARY OF THE INVENTION

It is an object of the present invention to provide a graphic-transforming apparatus and method for transforming any graphic freely and easily.

It is another object of the present invention to provide a graphic-transforming apparatus and method for deleting and redrawing any portion of an object graphic at the same time.

The present invention realizes processing of transformations in which a part of an object graphic is replaced with a part or the whole of a pattern according to certain rules by setting up an object graphic consisting of curves and polygonal lines to be transformed and a pattern consisting of closed curves and functioning as a ruler and by specifying a range to be transformed, that is, by specifying starting and ending points and the direction of a route. The pattern consists of any line drawing such as a circle or polygon, which can be moved (and also, rotated, enlarged, and contracted). Therefore, it is possible to freely operate the pattern on the object graphic like moving a ruler on a drawing paper.

The following rules are applied to the starting and ending points and the route.

(1) The starting point must be an intersection between the object graphic and the pattern.

(2) The ending point must be a point on the pattern.

(3) The specified portion from the starting point of the pattern to the ending point of it through the route in the specified direction must be replaced with the specified portion from the starting point of the object graphic to its ending point or its extreme point.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 5 is a flowchart showing the outline of the graphic transforming apparatus according to the present invention;

FIG. 6 shows the detailed flow of the operation for acquisition of the pattern in FIG. 5;

DETAILED DESCRIPTION OF THE PREFERRED EMBODIMENT

Figure 1:
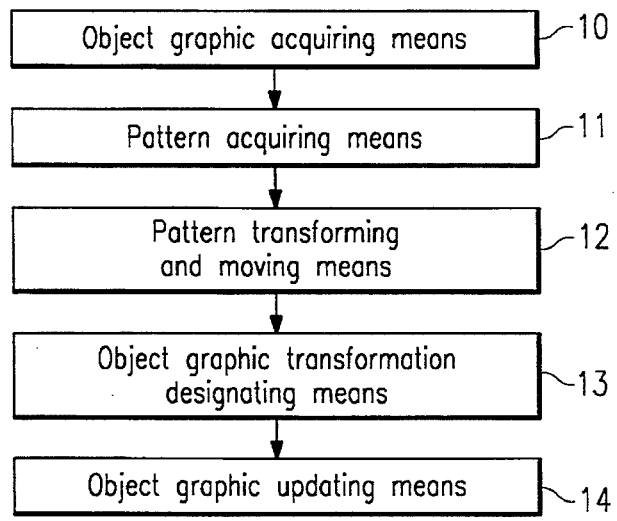
FIG. 1 shows the functional configuration of the graphic transforming apparatus which is an embodiment of the present invention.

FIG. 1 shows the functional configuration of the graphic-transforming apparatus which is an embodiment of the present invention. In the figure, 10 is an object graphic acquiring means for inputting and acquiring the data for the graphic to be transformed, that is, an "object graphic", 11 is a pattern acquiring means for generating or acquiring a "pattern" functioning as a ruler, 12 is a pattern transforming and moving means for transforming and moving the generated or acquired pattern, 13 is an object graphic transformation indicating means for indicating the relationship between a pattern and object graphic in order to transform the object graphic by replacing a part of the object graphic with the pattern transforming the graphic, 14 is an objects graphic transforming means for transforming an object graphic by a certain theory according to indication by the object graphic transformation indicating means, and 15 is an outputting means for outputting the result of transformation.

Figure 2:
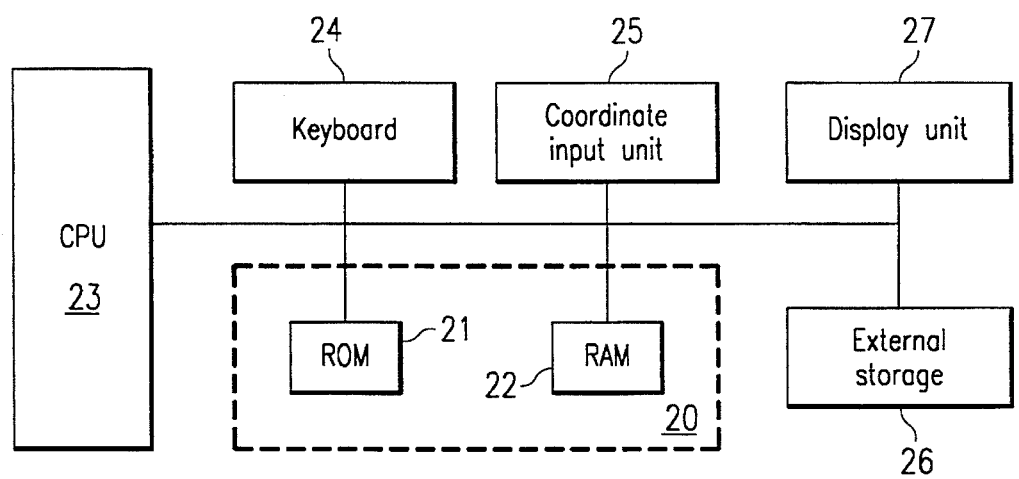
FIG. 2 shows an example of the system configuration for realizing the graphic transforming apparatus in FIG. 1 with a general-purpose computer.

FIG. 2 shows a system configuration for realizing the graphic-transforming apparatus in FIG. 1 using a general-purpose computer. In FIG. 2, 20 is a storage section including ROM 21, RAM 22, and a buffer, holding the computer graphics procedures and commands and data necessary for graphic processing. That is, the procedure for executing functions such as the object graphic acquiring means, the pattern acquiring means, the pattern transforming and moving means, the object graphic transformation indicating means, and the object graphic transforming means are stored in the form of programs together with related data. The outlines of these programs are described later. 23 is a CPU, which constitutes a part of the above means and which processes graphics (generation, acquisition, and transformation) for the object graphic and pattern according to the above procedure. Graphic information including the coordinate values of the object graphic and pattern inputted through an input unit such as the keyboard 24 or the coordinate input unit 25, the operation process of graphic processing (generation, acquisition, and transformation), and the final results is stored in the storage section 20. Although as the coordinate input unit 25, a mouse is used for this embodiment, it may be a pen tablet or track ball. 26 is an external storage for supporting the ROM and RAM, 27 is a display unit for allowing the user to interactively input the information, commands, and menus necessary for graphic processing, and for outputting and displaying the results of graphic processing.

Figure 3:
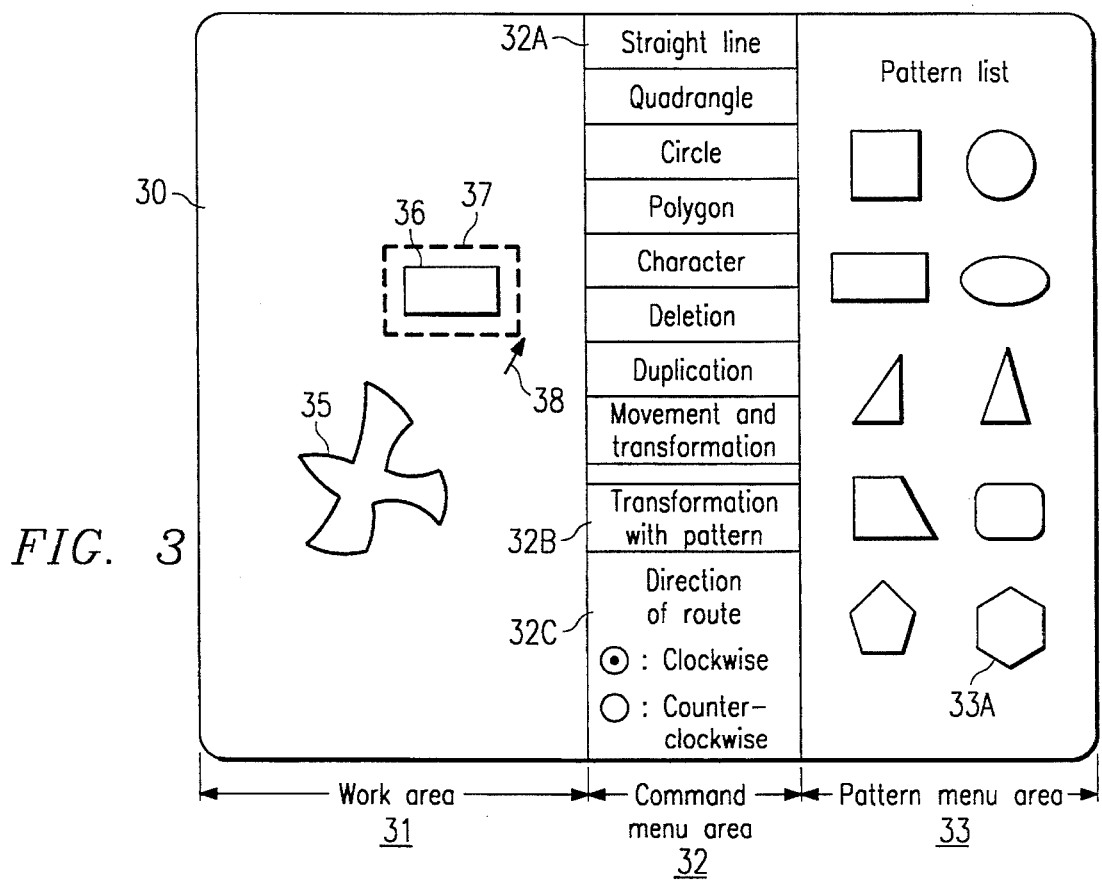
FIG. 3 shows an example of the display screen of the display unit in FIG. 2.

FIG. 3 shows an example of the display screen 30 of the display unit 27. The display screen 30 has a work area 31, a core and menu area 32, and a pattern menu area 33. An object graphic 35, a pattern 36, a pattern moving and transforming frame 37, and a cursor 38 are displayed in the work area 31. In command menu area 32, a command menu 32A, for the graphic processing generally provided in conventional graphic programs for straight lines and rectangles and the commands for transformation under the present invention, that is, command 32B for specifying "transformation by pattern", and menu 32C for specifying the direction of the route are displayed. The pattern menu area 33 includes a library area showing pattern library 33A stored in the storage section 20.

Figure 4:
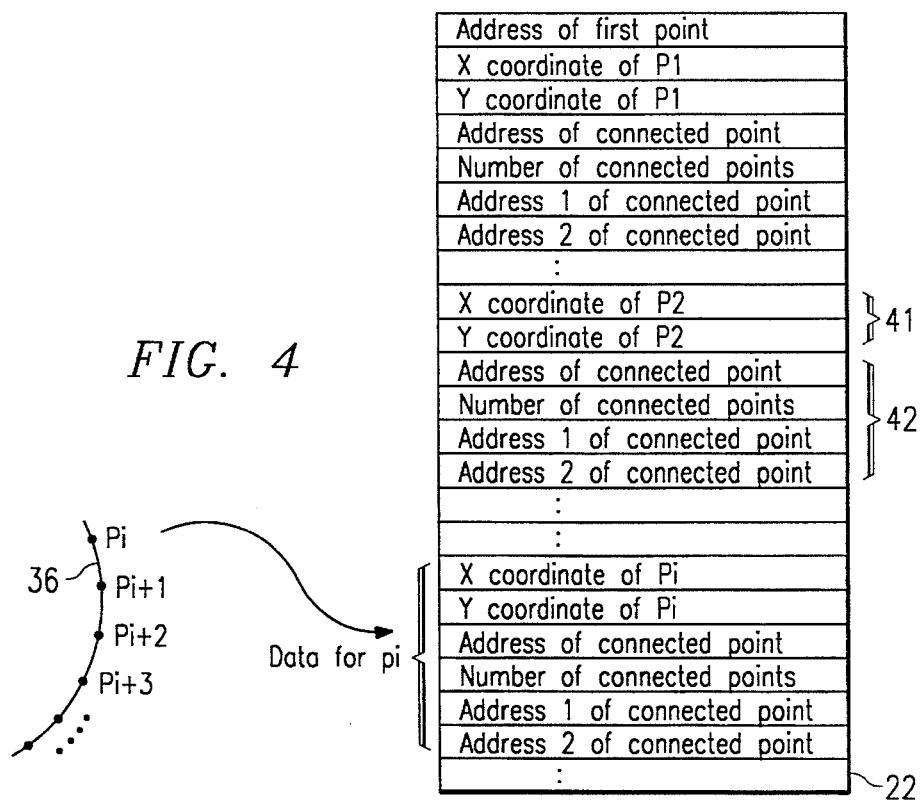
FIG. 4 shows an example of the data structure of a pattern stored in the storage section.

The object graphic 35 and the pattern 36, as shown in FIG. 4, consist of an aggregate of points (P1, P2, . . . , Pi, . . . ). The "X and Y coordinates" 41 of each point Pi and the "data indicating the points connected to each point Pi" 42 are stored in the RAM 22 of the storage section 20. FIG. 4 shows the data structure of the pattern 36. For the pattern moving and transforming frame 37, the data for the X and Y coordinates, width, height, inclination, and central-point position of the frame is stored in the RAM 22.

FIG. 5 is a flowchart showing the outline of graphic transformation according to the present invention. First, the object graphic 35 is acquired by the object graphic acquiring means 10 (step 502). Then, the pattern 36 is acquired by the pattern acquiring means 11 (step 504). The pattern 36 is a line drawing having a single closed route, which consists of, for example, a closed curve such as a polygon or circle. The pattern 36 is transformed according to necessity before it is moved so that at least a part of the pattern 36 is overlapped with the object graphic 35 (step 506). Then, the direction of the route (clockwise or counterclockwise) is specified (step 508) and an intersection between the pattern 36 and the object graphic 35 is specified as a starting point (step 510). Moreover, a point on the pattern is arbitrarily specified as an ending point (step 512). It is also possible to specify the direction of the route in a step before this. According to these specifications and the previously given transformation rules, the specified portions on the object graphic and the pattern are determined, that is, the data for the specified portions is discriminated by the object graphic transforming means 13 (steps 514 and 516). Finally, the data for the specified portion of the object graphic data is replaced with the data for the specified portion of the pattern (step 518).

The following are the rules for graphic transformation.

(1) The first point or the starting point (PS) must be an intersection between the object graphic and the pattern.

(2) When the second point or the ending point (PT) is another intersection between the object graphic and the pattern, the portion between the starting point TS and the ending point TT on the object graphic is replaced with the portion between the starting point CS and the ending point CT on the pattern. In this case, the portion between the starting point CS and the ending point CT on the pattern is defined as the route extending in the specified direction from CS.

(3) When the ending point PT is not an intersection between the object graphic and the pattern, the portion between the starting point TS and the extreme point TL on the object graphic is replaced with the portion between the starting point CS and the ending point CT on the pattern. In this case, the extreme point TL is defined as the extreme point at the inside of the pattern by using the starting point TS as a boundary.

Acquisition of the object graphic 35 by the object graphic acquiring means 10 is a process for storing data in the RAM 22 for points constituting the object graphic, that is, the x and y coordinate values and the data for connective relationships between points.

FIG. 6 shows a detailed flow of the acquisition of the pattern 36 (step 504 in FIG. 5), which starts when the operator selects the command 32B for specifying "transformation by pattern" in the command menu on the screen (step 602). This operation changes the graphic processing mode, and the pattern library 33A is displayed on the screen as shown in FIG. 3 (step 606). The operator decides whether or not to use the pattern library (step 608). When he uses the pattern library, he moves the cursor 38 to the area 33A on the screen, clicks the mouse (by pressing the button on the mouse and immediately releasing it) to select a pattern in the pattern library 33A and to move it to the work area 31 (steps 610 and 612). When he does not use the pattern library, he directly generates a pattern consisting of a line drawing in the work area 31 (step 614). Then, he specifies a rectangular area that includes the closed curve by dragging with the mouse (by moving the mouse from one point to another on the screen while pressing its button and releasing it) to generate the moving and transforming frame 37 (steps 616 and 618). The closed curve and the moving and transforming frame can be generated by using a conventional graphic program. The data for the pattern and the frame is stored in the storage section. It is also possible to add a newly-generated pattern to the pattern library.

Figure 7:
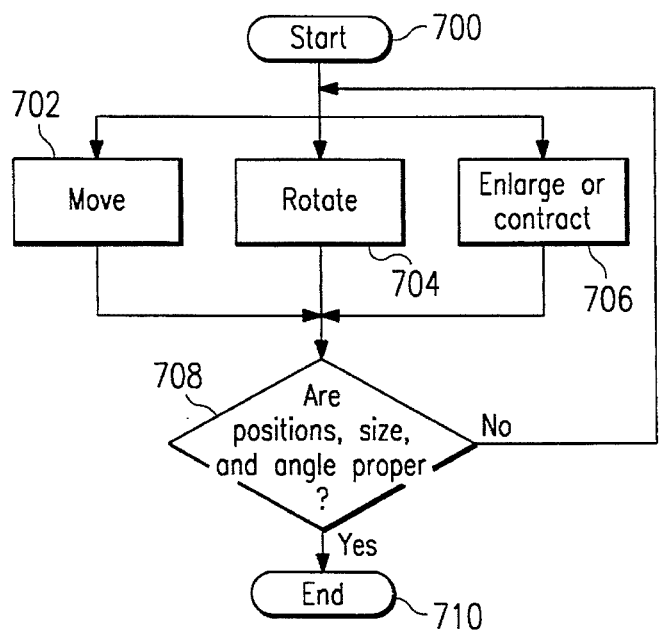
FIG. 7 shows a flow for transforming and moving the pattern in FIG. 5.
Figure 8:
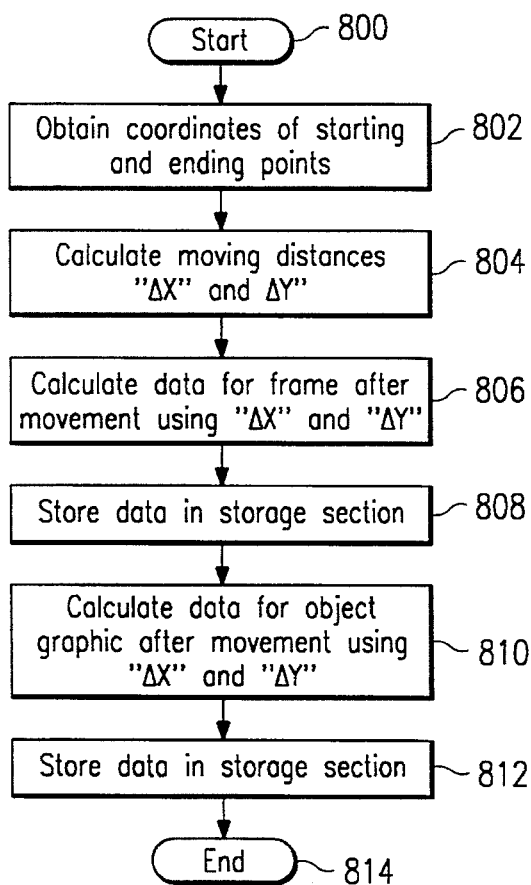
FIG. 8 shows the state of computation by the CPU for the case of movement in FIG. 7.
Figure 9:
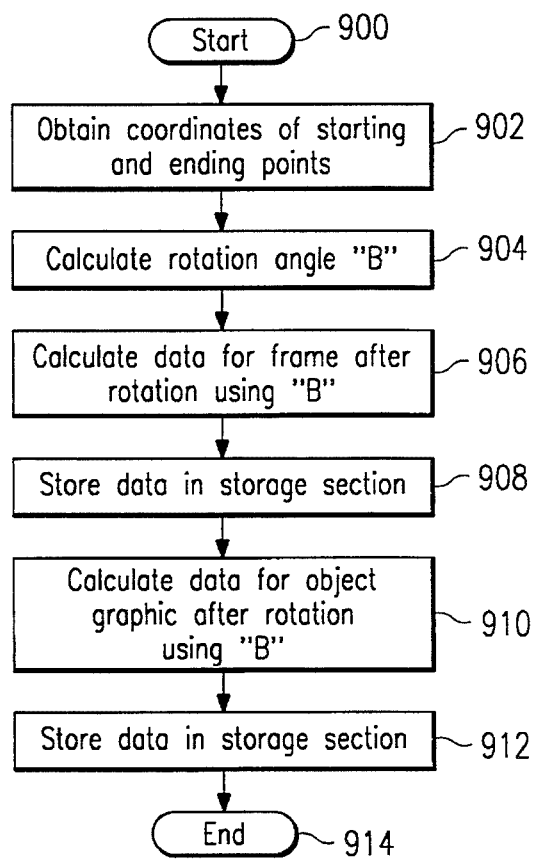
FIG. 9 shows the state of computation by the CPU for the case of rotation in FIG. 7.
Figure 10:
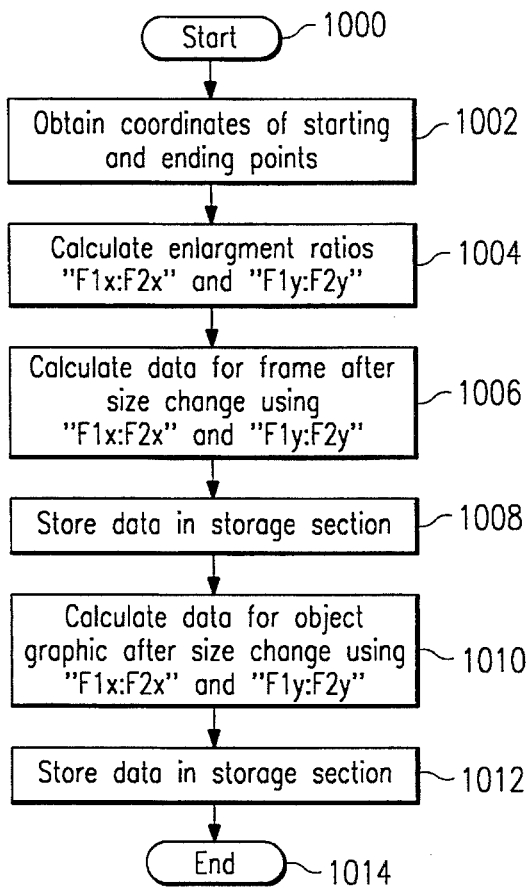
FIG. 10 shows the state of computation by the CPU for the case of size change in FIG. 7.

FIG. 7 shows the flow of transformation and movement of the pattern 36 (step 506 in FIG. 5), in which the pattern is moved, enlarged, contracted, or rotated so that it is brought into a position, size, and angle suitable for transformation. That is, the x and y coordinate values of points in the pattern are calculated by the CPU according to commands movement, enlargement, contraction, or rotation selected by the operator and according to the distance of mouse movement, and the data in the storage section is updated. For movement, as shown in FIG. 8, the coordinates of the starting and ending points for dragging by the mouse are first obtained. Then, the moving distances "ΔX" and "ΔY" are obtained from the difference between these coordinate values (step 804), and the data for the frame and that for the object graphic after movement are calculated and stored in the storage section (steps 806 through 812). For rotation, as shown in FIG. 9, the rotation angle "θ" of the frame is obtained from the difference between the coordinate values of the starting and ending points for dragging (step 904), and the data for the frame and for the object graphic after rotation are calculated and stored in the storage section (steps 906 through 912). For enlargement or contraction, as shown in FIG. 10, the change ratio of the frame size is obtained (step 1004), and the data for the frame and that for the object graphic after changing the size are calculated and stored in the storage section (steps 1006 through 1012).

Figure 11:
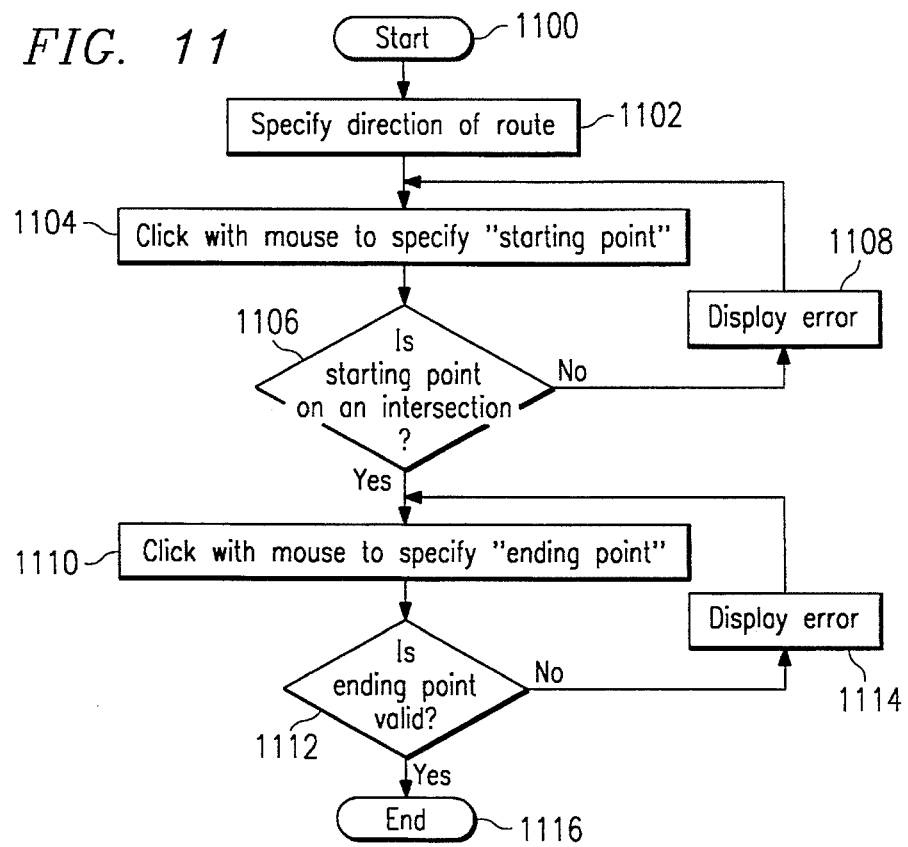
FIG. 11 shows the flow for the transformation in FIG. 5.

FIGS. 11 and 12 show various specification operations necessary for transformation. The operator first specifies the direction of the route using the route specifying menu 32C in the display screen 30 (step 1102). Then, the operator clicks an intersection between the pattern 36 and the object graphic 35 with the mouse to specify it as the starting point PS (step 1104). If a point other than an intersection is clicked, an error is displayed on the screen to prompt the operator to input correct data (steps 1106 through 1108). In addition, he clicks another point on the pattern to specify it as the ending point PT (step 1110). If a point that is invalid as the ending point PT is clicked, an error is displayed to prompt the operator to input correct data (steps 1112 through 1114). For example, an error appears when the same point as the starting point PS is clicked as the ending point PT or when a point not present on the pattern is clicked.

Figure 12A:
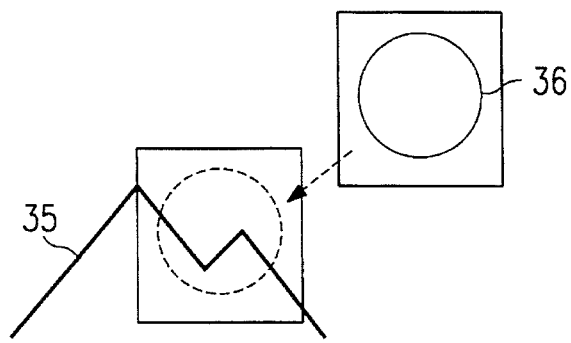
FIGS. 12(A–F) are an explanatory drawings for various specification operations necessary for transformation.
Figure 12B:
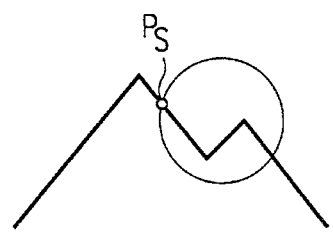
Figure 12C:
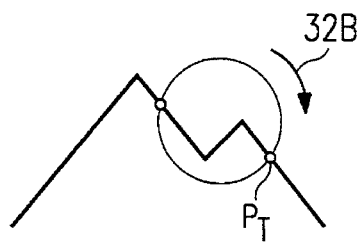
Figure 12D:
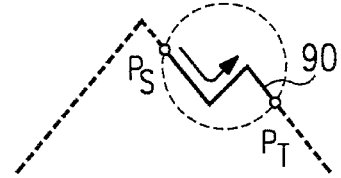
Figure 12E:
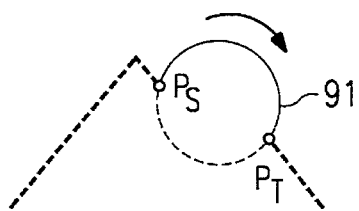
Figure 12F:
Figure 13:
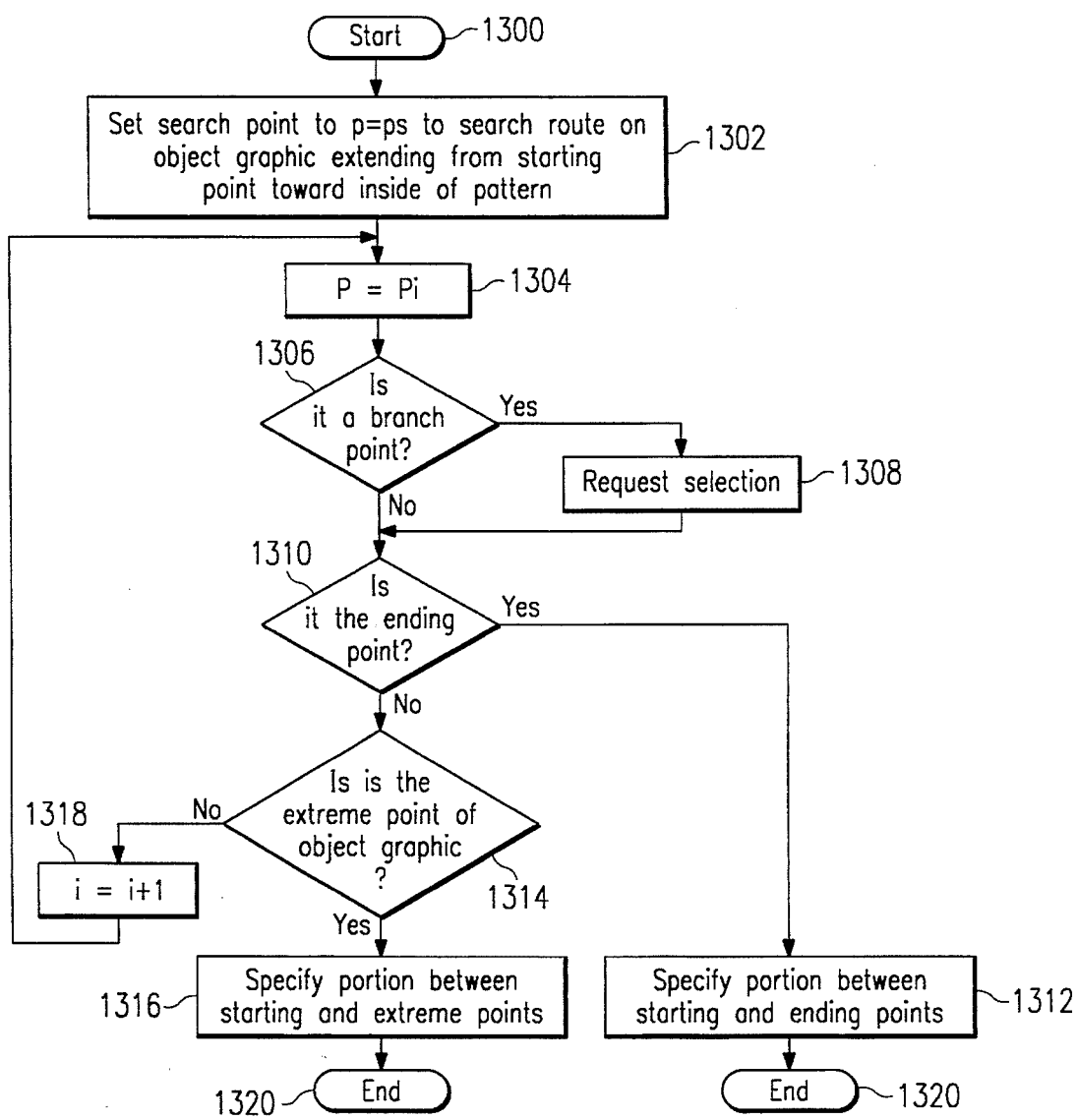
FIG. 13 shows details of determination of the specified portion on the object graphic, that is discrimination of data for a specified portion on it.

FIG. 13 shows the procedure for determination of the specified portion on the object graphic or for discrimination of the data for the specified portion in step 514. The starting point (PS in FIG. 12(B)) on the object graphic is set to be the search point, and a search of each point Pi of the route extending to the inside of the pattern from the starting point is started (step 1302). When the search point is a branch point on the object graphic, a request for selection is displayed (because the state in which the search point is a branch point cannot be processed) in order to prompt the operator to indicate which branch route is to be taken (steps 1306 through 1308). In other words, when the ending point PT is found earlier than the extreme point, the portion between the starting point PS and the ending point PT is uniquely determined as the specified portion 90 (D, FIG. 12) (steps 1310 through 1312). When the ending point PT is absent on the route of the object graphic, but the extreme point PL is present on it, in other words, when the extreme point is first encountered on the route instead of the ending point, the portion between the starting point PS and the extreme point PL is uniquely determined as the specified portion 90 of the object graphic (steps 1314 through 1316). Each point on the route is searched similarly (step 1318).

For the procedure for determination of the specified portion on the pattern or for discrimination of the data for the specified portion on it in step 516 of the FIG. 5, as shown in FIG. 12(C), the section 91 connecting the starting point PS and the ending point PT on the pattern in the specified route direction is uniquely determined as the specified portion on the pattern. If a branch point is present on the route of the pattern, a branch route in one direction (e.g. right side) is searched. Unless the ending point PT is present on the branch route, the other branch route will be searched again, starting with the branch point.

Figure 14:
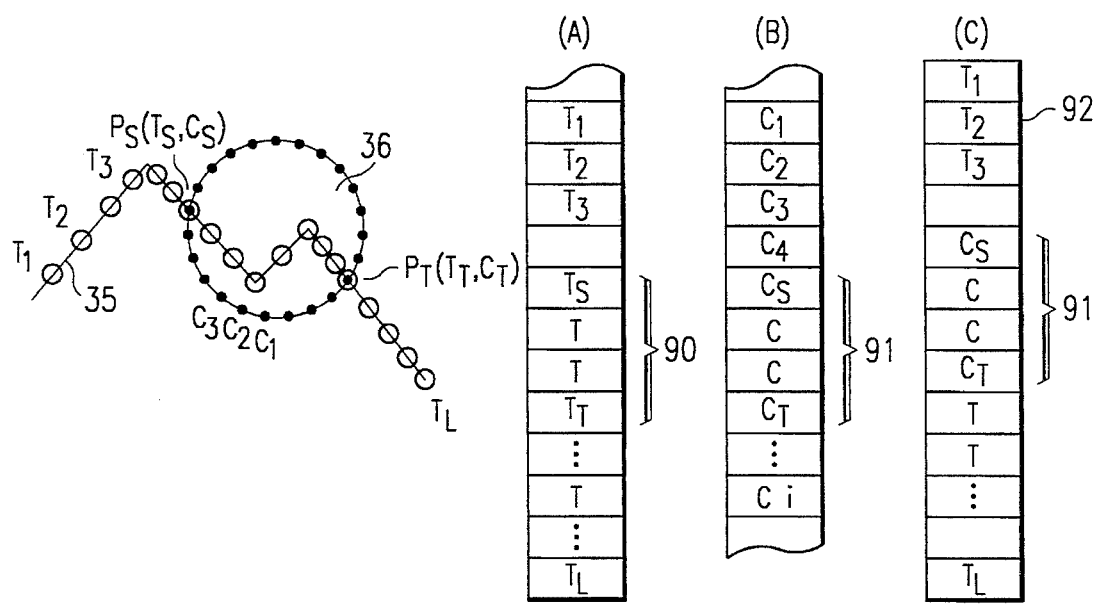
FIG. 14 shows the data structure in the storage for the transformation in FIG. 5.
Figure 15A:
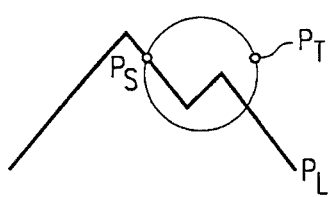
FIGS. 15(A–D) show the state of graphic processing when the end point is not the intersection between the object graphic and pattern.
Figure 15B:
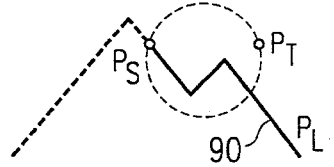
Figure 15C:
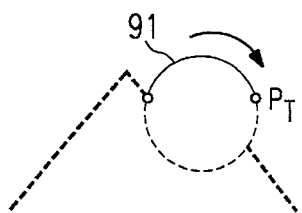
Figure 15D:
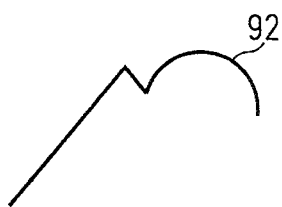
Figure 16A:
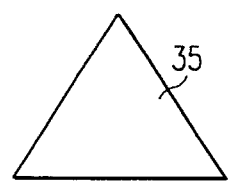
FIGS. 16(A–K) show an example of the procedure for drawing a picture of a bird on a display screen using the present invention.
Figure 16B:
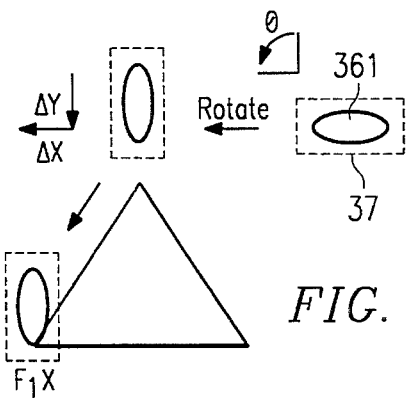
Figure 16C:
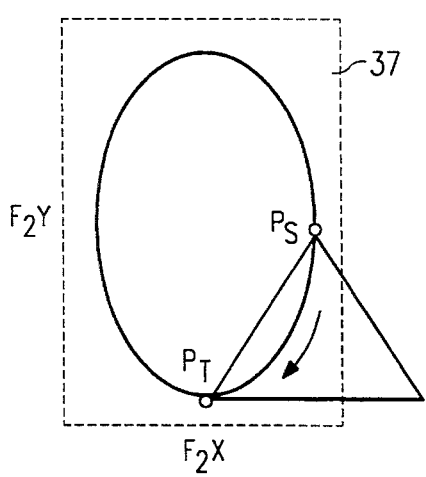
Figure 16D:
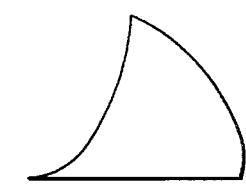
Figure 16E:
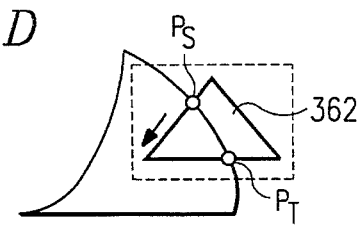
Figure 16F:
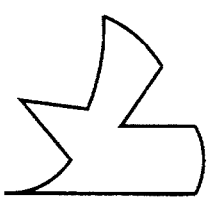
Figure 16G:
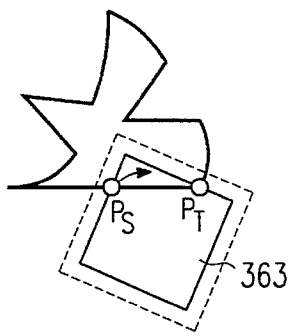
Figure 16H:
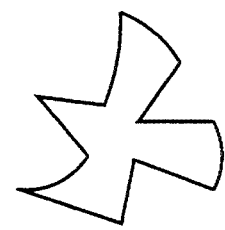
Figure 16I:
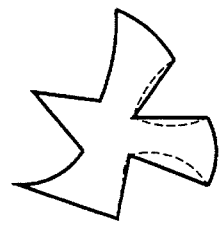
Figure 16J:
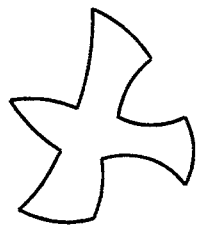
Figure 16K:
Figure 17A:
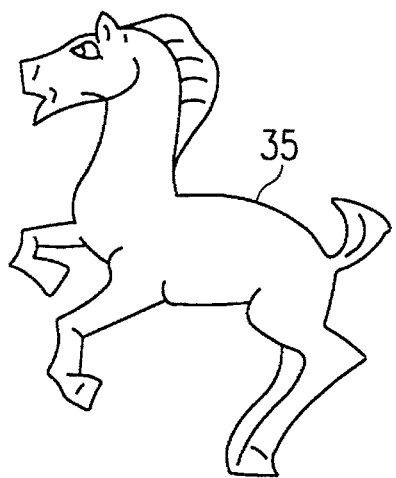
FIGS. 17(A–D) show an example of drawing a picture of a flying horse on a display screen using the prevent invention.
Figure 17B:
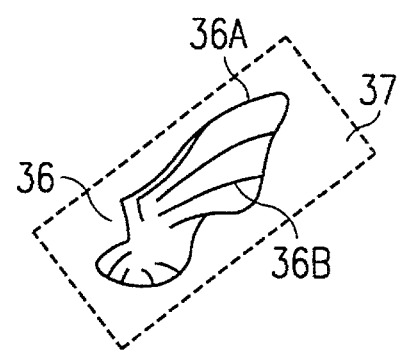
Figure 17C:
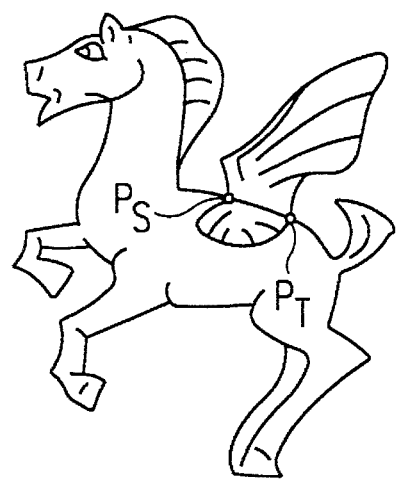
Figure 17D:
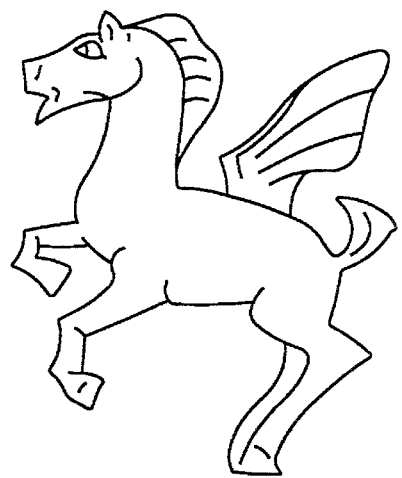

FIG. 14 shows the status of the data structure stored in the RAM 22 in steps 518 through 520 in FIG. 5. That is, for the example in FIG. 12, the data for the specified portion on the object graphic is replaced with the data for the specified portion on the pattern. In other words, the data of TS through TT for the specified portion 90 on the object graphic 35 shown in (A) is replaced with the data of CS through CT for the specified portion 91 of the pattern 36 in (B) and the data for the transformed graphic 92 in (C) is obtained. T and C are data values corresponding respectively to 41 and 42 at each point Pi of the object graphic 35 and pattern 36 in FIG. 4.

FIG. 15 shows the graphic processing when the end point PT is not an intersection between the object graphic and the pattern, in which the specified portion 91 on the pattern is replaced with the specified portion 90 between the starting point PS and the extreme point PL and the transformed graphic 92 (D) is formed.

FIG. 16 shows an example of drawing a bird picture using the present invention. First, the triangle 351 is drawn as the object graphic (A), the ellipse 361 in the library is adopted as the pattern, and the moving and transforming frame 37 is generated. Then, the frame 37 is rotated and moved to put it on a position close to the apex of the triangle (B). Then, the ellipse 361 is enlarged together with the frame 37. Moreover, to transform one side of the triangle, the starting point PS, the ending point PT, and the direction of the route are specified (C). Similarly, the other side is also transformed (D). In addition, the triangle 362 in the library is adopted and transformed by specifying the starting point PS, the ending point PT, and the direction of the route (E).

Similarly, the other side is also transformed (F). In addition, the square 363 is adopted as a pattern and transformed by specifying the starting point PS, the ending point PT, and the direction of the route (G). Similarly, the other side is transformed (H). In the same way, it is transformed by using patterns such as a circle or an ellipse (I and J). Finally, detailed portions are finished up by using a normal plotting program according to necessity (K).

The graphics to be adopted as patterns should be composed of a single closed route. Therefore, graphics consisting of simple line drawings are preferable. However, it is possible to use a graphic with a branch route branched into a single closed route unless the branch route intersects with the object graphic. For example, as shown in FIG. 17, it is permitted for the pattern 36 to consist of a closed contour 36A and a plurality of branches 36B. FIG. 17 shows an example of adding a wing to a horse that is the object graphic. The picture of the flying horse shown in (D) can be obtained by using the wing 36 as the pattern, moving it to the back of the horse 35 so that it overlaps the back of the horse (C), making the intersections the starting point PS and the ending point PT, and specifying the route with an arrow to transform it.

Advantages of the invention

The present invention has the advantage that a graphic can freely be transformed with easy operations, that is, re-drawing of a line drawing and deletion of unnecessary lines can be executed at the same time.

Upon reference to the foregoing, it will be understood that the applicant has provided a novel and useful method and apparatus for transforming graphics. While the invention has been particularly shown and described with reference to a preferred embodiment, it will be understood that various changes in form and detail may be made therein without departing from the spirit and scope of the invention.

I claim:

1. A method for transforming a graphic by a graphic transforming apparatus having input means, storage means, computation means, and display means, said method comprising the steps of:

setting up a line drawing to be transformed as an object graphic for display on said display means, wherein said object graphic has an extreme point at an end of a line of the line drawing, setting up and acquiring any line drawing as a pattern for transformation for display on said display means, moving said pattern so that it intersects with said object graphic at at least one intersection, and also specifying an intersection between said object graphic and said pattern as a starting point, and also specifying a point on said pattern as an ending point, wherein said ending point is not an intersection between said object graphic and said pattern, and uniquely specifying the portion between the starting point on said object graphic and the extreme point on said object graphic as a specified portion by said computation means, and also uniquely specifying the portion between the starting point and the ending point on said pattern, and replacing said specified portion on said object graphic with the specified portion on said pattern by said computation means.

2. A method for transforming a graphic according to claim 1, further including the step of specifying a direction of a route on said pattern.

3. A method for transforming a graphic according to claim 2, wherein the step of uniquely specifying the portion between the starting point and the ending point on said pattern includes the step of uniquely specifying the portion between the starting point and the ending point along the specified direction of the route on said pattern.

4. A method for transforming a graphic according to claim 1, wherein, in the step of setting up and acquiring said pattern, a line drawing consisting of a single closed route is used as a pattern.

5. A method for transforming a graphic according to claim 4, wherein the step of uniquely specifying the portion between the starting point on said object graphic and the extreme point on said object graphic as a specified portion by said computation means includes uniquely specifying the portion between the starting point on said object graphic and the extreme point on said object graphic, through an inside of the single closed route of the pattern, as a specified portion by said computation means.

6. A method for transforming a graphic according to claim 1, wherein, in the step of acquiring said pattern, one of a plurality of previously-prepared patterns is selected and, in the step of moving said pattern, said selected pattern is transformed into a state suitable for transformation of said object graphic.

7. A graphic transforming apparatus comprising:

object graphic setting up means for setting up a line drawing to be transformed as a object graphic, wherein said object graphic has an extreme point at an end of a line of the line drawing, pattern acquiring means for setting up and acquiring any line drawing as a pattern for transformation, pattern moving means for moving said pattern so that it intersects with said object graphic at at least one intersection, object graphic transformation indicating means for specifying an intersection between said object graphic and the pattern as a starting point and also for specifying a point on said pattern as an ending point, specified portion determining means for uniquely specifying the portion connecting the starting point on said object graphic with the extreme point of said object graphic, and also for uniquely specifying the portion from said starting point to said ending point on said pattern, and updating means for replacing said specified portion on said object graphic with the specified portion on said pattern.

8. A graphic transforming apparatus according to claim 7, further including object transformation indicating means for specifying a direction of a route on said pattern.

9. A graphic transforming apparatus according to claim 8, wherein the specified portion determining means for uniquely specifying the portion from said starting point to said ending point on said pattern includes the step of uniquely specifying the portion from said starting point to said ending point along the specified direction of the route on said pattern.

10. A graphic transforming apparatus according to claim 7, wherein the line drawing that is set up and acquired by the pattern acquiring means is a line drawing consisting of a single closed route and wherein the specified portion determining means for uniquely specifying the portion connecting the starting point on said object graphic with the extreme point of said object graphic includes specified portion determining means for uniquely specifying the portion connecting the starting point on said object graphic with the extreme point of said object graphic through an inside of the single closed route of the line drawing of the pattern.

11. A graphic transforming apparatus according to claim 7, wherein said object graphic transformation designating means checks the validity of indication of the starting and the ending points on said pattern and includes a means for displaying an error for improper indication.

12. A graphic transforming apparatus according to claim 7, wherein said pattern acquiring means for acquiring said pattern has in advance a plurality of patterns to be selected.

13. A graphic transforming apparatus according to claim 7, wherein said pattern moving means for moving said pattern includes a means for moving, enlarging, contracting, or rotating said pattern.

* * * * *